Aug. 23, 1966 G. F. HAUSMANN 3,268,175
HOT GAS BLEED THRUST VECTOR CONTROL SYSTEM
Filed Sept. 27, 1963
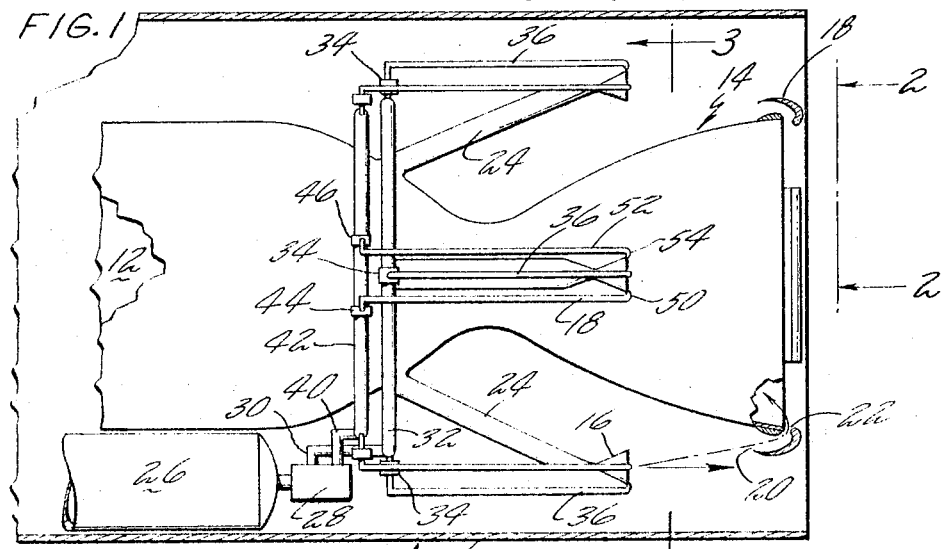
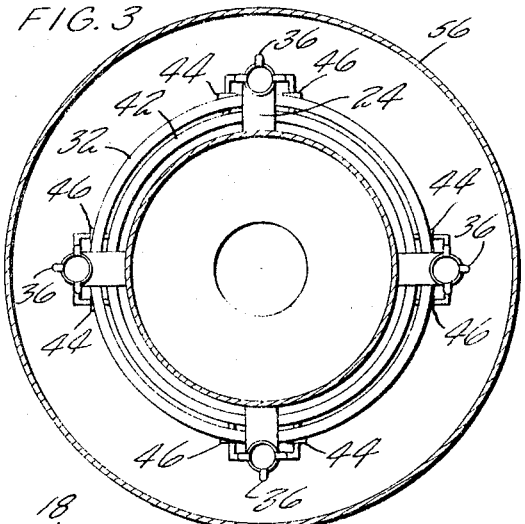
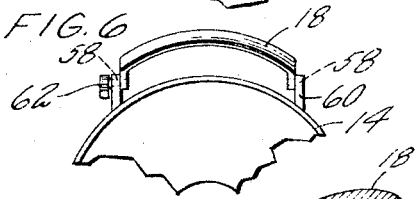
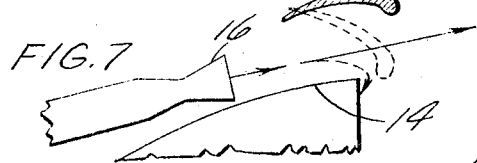
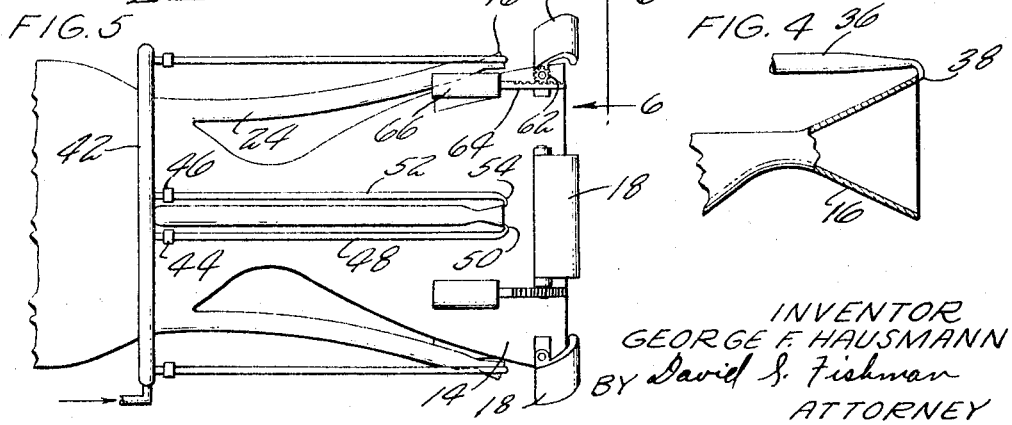
INVENTOR
GEORGE F. HAUSMANN
BY David S. Fishman
ATTORNEY

United States Patent Office

3,268,175
Patented August 23, 1966

3,268,175
HOT GAS BLEED THRUST VECTOR
CONTROL SYSTEM
George F. Hausmann, Glastonbury, Conn., assignor to United Aircraft Corporation, East Hartford, Conn., a corporation of Delaware
Filed Sept. 27, 1963, Ser. No. 312,212
18 Claims. (Cl. 239—265.23)

This invention relates to a novel directional control means for a propulsive vehicle. More particularly, this invention relates to a system for injection thrust vectoring wherein high temperature gas is used as the injectant without recourse to mecahnical valves in the stream of hot gas.

It is well known in the art of directional control of propulsive vehicles through fluid injection into a supersonic exhaust nozzle to generate shock waves therein, that it is particularly desirable and advantageous to use a high temperature fluid as the injectant since the side force which is produced is proportional to the square root of the temperature of the injected gas. Hot gas bled from the main combustion chamber is the most logical source of such high temperature gas, although the discharge from a gas generator is another readily apparent source. However, the use of high temperature gases as the injectant raises very serious problems in valving the hot gas, and it is doubtful that a mechanical modulating valve can be used to control the amount of bleed flow directed to the injection ports because of the extremely high temperature of the gases. Furthermore, a positive acting valve system would also cause pressure disturbances in the main propulsion system. Therefore, it is desirable to utilize a switching arrangement whereby gases are continuously bled at a constant rate from the main combustion chamber and wherein portions of the bleed flow are selectively switched into the exit of the primary nozzle when injection thrust vectoring is desired.

In the present invention a plurality of rearwardly directed auxiliary exhaust nozzles are spaced around the main exhaust nozzle of a propulsive vehicle, and an aerodynamic switch having no moving parts exposed to high temperature gases is used to selectively deliver the discharge from the auxiliary nozzles for injection into the main nozzle for directional control. When hot combustion chamber gases are bled from the combustion chamber for use as the secondary injection fluid, it also becomes important to minimize or eliminate losses in axial thrust during nonvectoring operation. Hence, it is desireable to discharge the bleed gases rearwardly at supersonic velocity during nonvectoring operation, and the auxiliary nozzles of the present invention accomplish this objective by discharging the bleed gases rearwardly at supersonic velocity during nonvectoring operation.

Secondary injection thrust vector directional control of the main propulsive jet is accomplished in a two-step amplification manner by first injecting a secondary fluid, preferably of low molecular weight such as helium, into an appropriate auxiliary nozzle. A shock wave is thereby created in the auxiliary nozzle in the usual injection vectoring manner, and the exhaust stream from the auxiliary nozzle is deflected toward the discharge end of the main exhaust nozzle where it is gathered in by a scoop and supersonic turning passage at the discharge end of the main nozzle and injected by the scoop upstream into the main exhaust nozzle to create a shock wave in the main nozzle for secondary fluid injection thrust vector control of the propulsive vehicle. The amount of helium which must be used to accomplish the ultimate objective of deflecting the main propulsive jet is minimized because of the amplification effect of the system wherein the helium signal to an auxiliary nozzle delivers a much larger flow of fluid, i.e., the discharge from the auxiliary nozzle, for injection into the main nozzle.

A very important feature of the system of the present invention is that secondary injection thrust vector control on the auxiliary jets can also be used to provide roll control for the entire propulsive vehicle. Roll control is accomplished by appropriately injecting helium into all of the auxiliary nozzles at similar points to deflect the auxiliary jets in a direction having a component substantially tangential to the main propulsive vehicle.

The present invention also discloses an alternate arrangement for delivering the discharge of the auxiliary nozzles into the main nozzle for directional control. In this alternate arrangement the scoops and supersonic turning vanes are selectively moved into and out of flow coupling with the discharge of the auxiliary nozzle to accomplish the desired injection into the main nozzle. Although this alternate system does involve the problem of moving parts in the handling of a hot gas flow, the problem is not as acute as in valving systems wherein a moving valve is continuously exposed to the entire hot gas flow. In the alternate system the moving scoop and turning vane is only in the path of the hot gas flow from the auxiliary nozzle when injection into the main nozzle is required.

Accordingly, one object of the present invention is to produce a novel hot gas secondary injection thrust vector control system having no moving parts continuously exposed to the hot gas and having minimum system weight.

Another object of the present invention is to produce a novel hot gas secondary injection thrust vector control system in which hot gas secondary injection fluid is normally discharge at supersonic velocity from auxiliary nozzles to supplement the thrust of the main nozzle of a propulsive vehicle and which is switched for secondary injection into the main nozzle by a valve having no moving parts.

Another object of the present invention is to produce a novel hot gas thrust vector control system in which the above-mentioned switching is accomplished by secondary injection into an auxiliary nozzle to divert the auxiliary nozzle flow into the main nozzle to thereby amplify the switching signal to the auxiliary nozzle.

Another object of the present invention is to produce a novel injection thrust vector control system in which injection thrust vectoring principles are utilized to deliver a supply of fluid to scoops and supersonic turning passages at the discharge end of a propulsive vehicle which receive the fluid and inject it into the propulsive vehicle for injection thrust vector control.

Still another object of the present invention is to produce a novel hot gas fluid injection thrust vector control system in which hot gases are bled from the combustion chamber to be used as the injection fluid, and in which the problems associated with hot gas valves having moving parts are eliminated without any loss of thrust when the bleed gas is not used for directional control.

Still another object of the present invention is to produce a novel hot gas secondary injection thrust vector control system having a capacity for roll control through secondary injection thrust vectoring.

Other objects and advantages will be apparent from the specification and claims, and from the accompanying drawings which illustrate an embodiment of the invention.

FIG. 1 is a schematic showing in elevation and partly in section of the main exhaust nozzle of a propulsive vehicle and the fluid injection thrust vector control system of the present invention.

FIG. 2 is a view taken along line 2—2 of FIG. 1 looking at the exhaust end of the main exhaust nozzle.

FIG. 3 is a view taken along line 3—3 of FIG. 1 showing details of the positioning of the auxiliary nozzles and associated piping.

FIG. 4 is an enlarged view of one auxiliary nozzle.

FIG. 5 is a showing of an alternate system.

FIG. 6 is a showing along line 6—6 of FIG. 5 of a detail of the system of FIG. 5.

FIG. 7 is a schematic showing of the operation of the system of FIG. 5.

Referring now to FIG. 1, a propulsive vehicle indicated generally at 10 has a combustion chamber 12 and a convergent-divergent main exhaust nozzle 14. A plurality of convergent-divergent auxiliary exhaust nozzles 16 are spaced around nozzle 14 upstream of the discharge end of nozzle 14, there being preferably four of the auxiliary nozzles 16 each spaced 90° apart. A plurality of arcuate scoops and supersonic turning vanes 18 (also see FIG. 2) are attached around the discharge end of nozzle 14, each scoop 18 corresponding to an auxiliary nozzle 16 and being aligned circumferentially with an auxiliary nozzle 16. Each scoop 18 has an open receiving end 20 to receive the discharge from its associated auxiliary nozzle 16 and an open discharge or injection end 22 facing upstream into the diverging portion of main nozzle 14. Auxiliary nozzles 16 are radially displaced from the axis of nozzle 14 a sufficient distance so that the normal axially directed discharge from each nozzle 16 passes by the corresponding scoop 18. Each auxiliary nozzle 16 is connected via a conduit 24 to combustion chamber 12 to bleed hot combustion chamber gases to be exhausted rearwardly through each auxiliary nozzle 16. Of course, the auxiliary nozzles could be supplied from one or more gas generators rather than from combustion chamber 12.

A fluid supply system is associated with the auxiliary nozzle to form a secondary fluid injection system for selectively delivering the discharge from an auxiliary nozzle 16 to a scoop 18. A source of low molecular weight gas 26 under pressure, such as helium, is connected via a distributing valve 28 and a conduit 30 to a manifold 32. As can be seen in both FIGS. 1 and 3, manifold 32 encircles nozzle 14 and is connected through valves 34 and conduits 36 to deliver the pressurized fluid to the outermost portion of the discharge end of each auxiliary nozzle to be injected into the auxiliary nozzles for secondary fluid injection thrust vectoring. The valves 28 and 34 can all either be manually operated or automatically operated, such as by gyroscopes, as desired.

Referring now to FIG. 4 which corresponds to an enlargement of the uppermost auxiliary nozzle 16 of FIG. 1, each conduit 36 terminates in an upstream-directed injection element 38 which injects the helium gas into nozzle 16 to generate a shock wave therein and change the direction of the discharge flow from the nozzle.

In the operation of the system described to this point, the hot gases from combustion chamber 12 pass through convergent-divergent nozzle 14 and are exhausted at supersonic velocity to produce thrust. Hot gases are bled from combustion chamber 12 to each auxiliary nozzle 16 via conduits 24, and the bleed gases are discharged rearwardly from each nozzle 16 at supersonic velocity to supplement the thrust from nozzle 14. When the propulsive vehicle deviates from its proper course, as by a pitch or yaw deviation, valve 28 and the appropriate valve 34 will open and secondary injection fluid will be delivered to the proper auxiliary nozzle 16. For example, assume that the center of gravity of the propulsive vehicle is forward, i.e., to the left, of combustion chamber 12, and assume that the vehicle pitches so that nozzle 14 rotates slightly clockwise. Valve 28 and the valve 34 leading to the uppermost auxiliary nozzle 16 would be opened, and the secondary hydrogen gas would be injected into the uppermost auxiliary nozzle 16. Since the gases in nozzle 16 are traveling at supersonic velocity, the injected fluid will create a shock wave in auxiliary nozzle 16 and deflect the exhaust stream from the auxiliary nozzle inwardly toward the discharge end of main nozzle 14. This deflected exhaust stream would then be coupled with scoop 18, i.e., received by the open end 20 of scoop 18, and in turn would be directed through the injection end 22 of scoop 18 into the divergent portion of nozzle 16 to create a shock wave in nozzle 14 and induce an upwardly directed force on the wall of nozzle 14. This force would, of course, tend to rotate the propulsive vehicle in a counterclockwise direction about the center of gravity to correct the pitch deviation. In a similar manner, other auxiliary nozzles would be actuated to supply secondary injection fluid from main nozzle 14 through the associated scoops to correct other pitch and yaw deviations.

It can be seen that the above-described system is a two-step secondary injection system in which secondary injection in the auxiliary nozzle is used to produce the injection fluid for secondary injection into the primary nozzle. The helium or other pressurized fluid delivered to the appropriate nozzle 16 constitutes a fluid signal commensurate with a desired directional control of the propulsive vehicle, and this fluid signal delivers the entire discharge from the auxiliary nozzle to the corresponding scoop 18 through which it is then all injected into the main nozzle 14 for directional control. Thus, the relatively small fluid flow directional control signal delivered to an auxiliary nozzle is substantially amplified in that it results in a much larger fluid flow, i.e. the auxiliary nozzle discharge, being delivered for injection vectoring into the main exhaust nozzle. Accordingly, the supply of helium which must be carried by the system is greatly reduced.

The auxiliary nozzle arrangement shown in FIGS. 1 and 3 can also be used to accomplish roll control of the propulsive vehicle. The pressurized fluid can be delivered from distributing valve 28 via conduit 40 to a second ring manifold 42 leading to roll control injection valves 44 and 46 associated with each auxiliary nozzle 16. Each valve 44 controls flow of the pressurized fluid to a similar side of each auxiliary nozzle 16 through a conduit 48 and an injection element 50, and each valve 46 controls flow of the pressurized fluid to the opposite side of each auxiliary nozzle 16 through a conduit 52 and an injection element 54. For roll control in one direction all of the valves 44 would be opened, and for roll control in the other direction all of the valves 46 would be opened. The injection of the pressurized fluid into auxiliary nozzles 16 from the valves 44 and 46 would create shock waves in each auxiliary nozzle and deflect the exhaust from each auxiliary nozzle in the same manner and with a component of flow tangential to the main nozzle to accomplish roll control.

An annular skirt 56 surrounds the entire configuration of the main exhaust nozzle and the auxiliary nozzles and terminates preferably in the plane of the discharge end of main nozzle 14 or at least not further upstream than the plane of the discharge ends of nozzles 16. Skirt 56 reduces drag and prevents injection of air during the atmospheric flight.

Referring now to FIG. 5 wherein like elements are numbered as in FIG. 1, an alternate structure is shown in which the scoops 18 are pivotally mounted at the discharge end of nozzle 14 and are moved into and out of coupling with the discharge flow from auxiliary nozzles 16 as desired. As can best be seen in FIG. 6, each scoop and turning vane 18 is pivotally mounted on rods or pins 58 which are supported by struts 60 fastened by any convenient means such as brazing or welding to the outer portion of nozzle 14. A gear 62 is driven by a rack 64 from a drive unit 66 such as a hydraulic power piston or an electric motor. There would, of course, preferably be four of the units such as shown in FIG. 6 disposed 90° apart around the periphery of nozzle 14, and each pivotable scoop and turning vane 18 would be driven by a separately actuated motor 66.

In FIG. 7 the positions of a scoop and turning vane 18 are shown schematically. Each scoop 18 is normally in the upper or retracted position as shown in the solid lines so that the discharge from the circumferentially aligned auxiliary nozzle 16 ordinarily passes between the retracted scoop and main nozzle 14. When it is desired to accomplish injection vectoring, the scoop is rotated, through actuator 66, rack 64, and gear 62, to the dotted position shown in FIG. 7 so that the output from the associated nozzle 16 is coupled with this scoop, i.e., intercepted by the scoop, and directed into the main nozzle 14 for directional control.

As can best be seen in FIGS. 6 and 7, the discharge from a nozzle 16 passes between the scoop 18 and the nozzle 14 when the scoop 18 is in the retracted position, and hence the scoops 18 are only in the hot exhaust stream from nozzles 16 when secondary injection into the primary nozzle is actually being accomplished through a particular scoop.

Referring again to FIG. 5, the scoop at the bottom of the drawing is shown in the active position wherein it has been moved into coupling with the discharge from its associated auxiliary nozzle, and the other scoops are shown in the retracted position. Of course, this showing in FIG. 5 is merely for purposes of illustration. The FIG. 5 configuration includes the manifold 42, the valves 44 and 46, the conduits 48 and 52, and the injection units 50 and 54 for roll control as described in connection with the FIG. 1 embodiment. The skirt 56 can also be provided in the FIG. 5 embodiment, and it will be understood that the scoops 18 can be supported and moved into and out of coupling with nozzles 16 by sliding movement of the scoops or in any other desired manner.

It is to be understood that the invention is not limited to the specific embodiment herein illustrated and described, but may be used in other ways without departure from its spirit as defined by the following claims.

I claim:

1. In a directional control system for a propulsive vehicle having a combustion chamber and a convergent-divergent exhaust nozzle for receiving gases from said combustion chamber and discharging said gases in a stream at supersonic velocity, means for generating an auxiliary supersonic gas stream discharging to atmosphere with at least a component of flow in the direction of the discharge from said exhaust nozzle, means for receiving said auxiliary gas stream and deflecting said auxiliary gas stream into said exhaust nozzle for directional control of said vehicle, said receiving and deflecting means normally not receiving said auxiliary stream, and means for selectively coupling said auxiliary stream with said receiving and deflecting means to deflect said auxiliary stream into said exhaust nozzle.

2. A directional control system as in claim 1 wherein said receiving and deflecting means includes a scoop normally positioned out of the path of said auxiliary stream, and means for moving said scoop into the path of said auxiliary stream.

3. In a directional control system for a propulsive vehicle having a combustion chamber and a convergent-divergent exhaust nozzle for receiving gases from said combustion chamber and discharging said gases in a stream at supersonic velocity, means for generating an auxiliary supersonic gas stream discharging to atmosphere with at least a component of flow in the same direction as the discharge from said exhaust nozzle, means for selectively changing the direction of said auxiliary stream to direct said auxiliary stream toward the discharge end of said exhaust nozzle, and means at the discharge end of said exhaust nozzle for receiving said auxiliary stream and deflecting said auxiliary stream into said exhaust nozzle to create a shock wave in the supersonic gas stream in said exhaust nozzle to induce a force on the wall of said exhaust nozzle for directional control of said propulsive vehicle.

4. A directional control system as in claim 3 wherein said means for changing the direction of said auxiliary stream includes means for generating a shock wave in said auxiliary stream.

5. A directional control system as in claim 3 wherein said means for generating an auxiliary supersonic gas stream includes an auxiliary nozzle discharging said auxiliary stream and wherein the means for changing the direction of said auxiliary stream includes means for injecting a fluid into said auxiliary nozzle to create a shock wave in the supersonic gas stream in said auxiliary nozzle.

6. A directional control system as in claim 5 including conduit means connecting said auxiliary nozzle to said combustion chamber to bleed gases from said combustion chamber to said auxiliary nozzle to generate said auxiliary supersonic exhaust stream.

7. In a directional control system for a propulsive vehicle having a combustion chamber and a convergent-divergent main exhaust nozzle for receiving gases from said combustion chamber and discharging said gases in a stream at supersonic velocity, a plurality of auxiliary nozzles in spaced relation to each other around said exhaust nozzle, conduit means connecting each of said auxiliary nozzles to said combustion chamber to bleed gases from said combustion chamber to said auxiliary nozzles, each of said auxiliary nozzles discharging said gas to atmosphere at supersonic velocity and with at least a component of flow in the same direction as the discharge from said main exhaust nozzle, said auxiliary nozzles being spaced upstream from the discharge end of said exhaust nozzle, an annular skirt surrounding said main exhaust nozzle and said auxiliary nozzles, means for selectively injecting a fluid into at least one of said auxiliary nozzles to create a shock wave in said one auxiliary nozzle to direct the discharge from said one auxiliary nozzle toward the discharge end of said main exhaust nozzle, and means at the discharge end of said main exhaust nozzle for receiving said directed discharge from said one auxiliary nozzle and deflecting said directed discharge into said main exhaust nozzle to create a shock wave in said main exhaust nozzle to induce a force on the wall of said main exhaust nozzle for directional control of said propulsive vehicle.

8. A directional control vehicle as in claim 7 including a plurality of individual means at the discharge end of said main exhaust nozzle for receiving directed discharge from said auxiliary nozzles and deflecting directed discharge into said main exhaust nozzle, each of said receiving means corresponding to one of said auxiliary nozzles, and each of said receiving means being aligned with the corresponding auxiliary nozzle.

9. A directional control system as in claim 7 including means for injecting a fluid into each of said auxiliary nozzles to create a shock wave in each of said auxiliary nozzles to similarly direct the discharge from each of said auxiliary nozzles for roll control.

10. In a directional control system for a propulsive vehicle having a combustion chamber and a convergent-divergent main exhaust nozzle for receiving gases from said combustion chamber and discharging said gases in a stream at supersonic velocity, a plurality of auxiliary nozzles upstream of the discharge end of said main exhaust nozzle in spaced relation to each other around said main exhaust nozzle, each of said auxiliary nozzles normally discharging a supersonic gas stream to atmosphere with at least a component of flow in the same direction as the discharge from said main exhaust nozzle, means for selectively injecting fluid into said auxiliary nozzles to selectively create shock waves in said auxiliary nozzles to direct the gas streams from said auxiliary nozzles toward the discharge end of said main exhaust nozzle, and means for deflecting said directed gas streams from said auxiliary nozzles into said main exhaust nozzle to create shock waves in the supersonic gas stream in said main exhaust nozzle to induce forces on the wall of said main exhaust nozzle for directional control of said propulsive vehicle.

11. A directional control system as in claim 10 wherein said means for deflecting the directed gas streams into the main exhaust nozzle includes a plurality of gas scoops attached to the discharge end of said main exhaust nozzle, each of said scoops having a first open end for receiving the directed gas streams and having a second open end facing upstream into said main exhaust nozzle for discharging the directed gas stream into said main exhaust nozzle, the number of said scoops corresponding to the number of said auxiliary nozzles and each of said scoops being aligned with an auxiliary nozzle.

12. A directional control system as in claim 11 wherein each of said auxiliary nozzles is connected to said combustion chamber to receive gases from said combustion chamber.

13. A directional control system as in claim 12 including an annular skirt surrounding said main exhaust nozzle and said auxiliary nozzles, said annular skirt extending to at least the plane of the discharge end of said auxiliary nozzles.

14. A directional control system as in claim 10 including means for injecting a fluid into each of said auxiliary nozzles to create a shock wave in each of said auxiliary nozzles to similarly direct the discharge from each of said auxiliary nozzles for roll control.

15. In a directional control system for a propulsive vehicle having a combustion chamber and a convergent-divergent exhaust nozzle for receiving gases from said combustion chamber and discharging said gases in a stream at supersonic velocity, means for generating an auxiliary supersonic gas stream including an auxiliary nozzle discharging said auxiliary stream to atmosphere, said auxiliary nozzle being upstream of the discharge end of said exhaust nozzle, means for generating a signal having a flow of fluid commensurate with a desired directional control of said propulsive vehicle, means for injecting said fluid into said auxiliary nozzle to create a shock wave in the supersonic gas stream in said auxiliary nozzle to induce an amplified fluid signal, and means for deflecting said amplified fluid signal into said exhaust nozzle to create a shock wave in said exhaust nozzle for directional control of said propulsive vehicle.

16. A directional control system as in claim 15 including conduit means connecting said auxiliary nozzle to said combustion chamber to bleed gases from said combustion chamber to said auxiliary nozzle to generate said auxiliary supersonic gas stream.

17. A directional control system as in claim 16 wherein said means for deflecting the amplified fluid signal into said exhaust nozzle includes a scoop atached to the discharge end of said exhaust nozzle and having a first opening for receiving said amplified fluid signal and a second opening facing into said exhaust nozzle.

18. A directional control system as in claim 17 including an annular skirt surrounding said exhaust nozzle and said auxiliary nozzle, said skirt extending to at least the plane of the discharge end of said auxiliary nozzles.

References Cited by the Examiner

UNITED STATES PATENTS

| | | | |
|---|---|---|---|
| 3,020,714 | 2/1962 | Eggers et al. | 60—35.54 |
| 3,066,485 | 12/1962 | Bertin et al. | 60—35.54 |
| 3,132,476 | 5/1964 | Conrad | 60—35.54 |
| 3,132,478 | 5/1964 | Thielman | 60—35.54 |
| 3,133,413 | 5/1964 | Lawrence | 60—35.54 |
| 3,135,291 | 6/1964 | Kepler et al. | 60—35.54 X |
| 3,143,856 | 8/1964 | Hausmann | 60—35.54 |
| 3,144,752 | 8/1964 | Kepler | 60—35.54 |
| 3,204,405 | 9/1965 | Warren et al. | 60—35.54 |

MARK NEWMAN, *Primary Examiner.*

A. L. SMITH, *Assistant Examiner.*